(12) United States Patent
Boudguiga et al.

(10) Patent No.: US 12,314,270 B2
(45) Date of Patent: May 27, 2025

(54) METHOD FOR MULTI-USER CONFIDENTIAL QUERYING OF THE PRESENCE OF A RECORD IN A DATABASE

(71) Applicant: COMMISSARIAT À L'ÉNERGIE ATOMIQUE ET AUX ÉNERGIES ALTERNATIVES, Paris (FR)

(72) Inventors: Aymen Boudguiga, Gif-sur-Yvette (FR); Renaud Sirdey, Gif-sur-Yvette (FR); Oana Stan, Gif-sur-Yvette (FR); Martin Zuber, Gif-sur-Yvette (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/298,180

(22) Filed: Apr. 10, 2023

(65) Prior Publication Data
US 2024/0054136 A1  Feb. 15, 2024

(30) Foreign Application Priority Data

Apr. 14, 2022 (FR) ...................................... 2203495

(51) Int. Cl.
G06F 16/2457 (2019.01)
G06F 21/31 (2013.01)
H04L 9/00 (2022.01)

(52) U.S. Cl.
CPC ........ *G06F 16/24575* (2019.01); *G06F 21/31* (2013.01); *H04L 9/008* (2013.01)

(58) Field of Classification Search
CPC ..... G06F 16/24575; G06F 21/31; H04L 9/008
(Continued)

(56) References Cited

U.S. PATENT DOCUMENTS

2011/0161656 A1* 6/2011 Rao ..................... H04L 63/0281
713/168
2013/0173917 A1* 7/2013 Clifton .................. G06F 16/334
713/167

(Continued)

OTHER PUBLICATIONS

Singh, Kalpana, et al. "Practical personalized genomics in the encrypted domain", Third International Conference on Fog and Mobile Edge Computing (FMEC), 2018, pp. 139-146.

(Continued)

*Primary Examiner* — Joshua Bullock
(74) *Attorney, Agent, or Firm* — McDonald Hopkins LLC (57) ABSTRACT

A method for confidentially querying the presence of a record in a database hosted by a server, the records being stored in the database in the form of digital footprints obtained by hashing a record by a public hash function. The footprints are masked by a stream cipher using a symmetric key of a first user. The first user may grant a second user authorisation to query the database by transmitting the inverse masks of various rows, encrypted by the public key of an additive homomorphic cryptosystem of the second user. The rows of the database are unmasked in the homomorphic domain and the second user transmits an encrypted request to query the base according to a PIR protocol. The second user can decrypt the response from the server using the private key of their homomorphic cryptosystem and determine whether the footprint sought is present in the response thus decrypted.

16 Claims, 3 Drawing Sheets

(58) Field of Classification Search
USPC .......................................................... 707/769
See application file for complete search history.

(56) References Cited

U.S. PATENT DOCUMENTS

| | | | |
|---|---|---|---|
| 2015/0143112 A1* | 5/2015 | Yavuz | G06F 21/6227 |
| | | | 713/165 |
| 2018/0262469 A1* | 9/2018 | Rane | G06F 21/6263 |
| 2018/0267981 A1* | 9/2018 | Sirdey | G06Q 10/047 |
| 2021/0126906 A1* | 4/2021 | Kobayashi | H04L 63/0421 |

OTHER PUBLICATIONS

EnQuery LLC, "Encryptedquery: Scalable private information retrieval", EnQuery, LLC, Nov. 29, 2018, pp. 1-20.

Abinaya, B. et al. "A survey on genomic data by privacy-preserving techniques perspectives", Computational Biology and Chemistry, 2021, vol. 93, No. 107538, pp. 1-11.

Xinyi, Zhao, et al. "Research on the Privacy-Preserving Retrieval over Ciphertext on Cloud", International Conference on Information Communication and Management, 2016, pp. 100-104.

* cited by examiner

METHOD FOR MULTI-USER CONFIDENTIAL QUERYING OF THE PRESENCE OF A RECORD IN A DATABASE

TECHNICAL FIELD

The present invention generally relates to the field of confidentially querying a database. It involves additive homomorphic encryption and requesting by Private Information Retrieval (PIR) protocol.

PRIOR ART

The confidential querying of a database makes it possible for a client to extract data from a base hosted by a remote server, without disclosing to third parties or to the server itself the subject of the request and the result thereof.

Confidential querying methods generally involve homomorphic encryption processing of the database queried. It is possible to distinguish those that use a Full Homomorphic Encryption (FHE) of the database and those that simply use an additive homomorphic encryption.

The first authorise a wide variety of types of requests but do not make it possible to scale in terms of size of the database, in other words they are not scalable to significant sizes of the base, at least for latency times (that is to say of response to a request) less than an acceptable threshold value (typically of a few minutes).

The second only make it possible for requests of restricted format but authorise easy scaling relative to the size of the database.

The Private Information Retrieval (PIR) protocol is a method for confidentially querying a database involving additive homomorphic encryption processing using the Paillier cryptosystem.

For example, a description will be found of a method for confidentially querying a database by means of the PIR protocol in the article entitled "EncryptedQuery scalable Private Information Retrieval", EnQuery, 29.11.2018.

However, this confidential querying method corresponds to a single-user use case. Indeed, the data stored in the base are hash values obtained by means of a private key encryption hash function, said private key belonging to the user.

Thus, if a second user desires to query the base in question, the private key used in the hash function must be communicated to the second user, without passing through the server, so as to protect the confidentiality with respect to the latter.

More generally, if various users each have a database (of the type envisaged above) and desire to share their access rights, they must exchange their private keys, which is not a satisfactory solution. Furthermore, it is understood in this scenario that there are as many private keys as databases, which leads to a multiplication of the number of requests for the same query.

The aim of the present invention is to propose a method for multi-user querying of a database that does not have the drawbacks of the prior art, in particular that does not require an exchange of confidential information between said users when a user desires to authorise another to access said base.

DISCLOSURE OF THE INVENTION

The present invention is defined by a method for confidentially querying the presence of a record in a database hosted by a server, said records being stored in the database in the form of digital footprints, each digital footprint being obtained by hashing a record by means of a public hash function and each row of the database containing the digital footprints sharing their m>1 first bits, said confidential querying method being original in that:

a first user has a stream cipher symmetric key and a second user has an at least additive homomorphic cryptosystem;

the rows of the database are encrypted by means of said stream cipher by adding masks each having the size of one row of the database;

the first user authorises the access to the database to the second user by encrypting the inverse masks by means of the public key of said homomorphic cryptosystem and by transmitting the inverse masks thus encrypted to the server;

the rows of the database are transcrypted in the homomorphic domain by adding to said rows inverse masks thus encrypted;

the second user computes the digital footprint of the record by means of said public hash function and deduces therefrom an integer value, $q_m$, corresponding to the m first bits;

the second user constructs a request in the form of a first vector of size $2^m$ consisting of a homomorphic ciphertext of the value "1" in position $q_m$ and of homomorphic ciphertexts of the value "0" in other positions, the request being transmitted to the server;

the server evaluates in the homomorphic domain the scalar product between the first vector and a second vector of size $2^m$ consisting of the encrypted rows of the database, the result being transmitted as a response to the second user;

the second user decrypts said response by means of the private key of their homomorphic cryptosystem and deduces therefrom the plaintext content of the row $q_m$ of the database;

the second user searches whether the digital footprint of the record is among the digital footprints of the row $q_m$ thus obtained.

The stream cipher may use an encryption primitive selected for example from AES-CTR, Trivium and Grain.

The cryptographic public hash function may be SHA-3.

According to an advantageous embodiment, the homomorphic cryptosystem is an additive homomorphic encryption.

The additive homomorphic encryption may preferably use a public key Paillier cryptosystem (g, n) with n=pq where p, q are two prime numbers.

In this case, the server returns as response a first and a second ciphertext stored in the row $q_m$, the second user performing a decryption of each of the first and second ciphertexts by means of the private key of its homomorphic cryptosystem, then performs a decryption by means of this same private key of the results thus obtained after having concatenated them.

According to one variant, the additive homomorphic encryption uses a plurality N of ciphertexts of "0" by a Paillier encryption, $h_i$, i=1, ...,N, the additive homomorphic encryption of an integer μ being obtained by:

$$c = g^\mu \pi_{i=i}^N \max(1, u_i h_i) \bmod n^2 \qquad \text{[Math. 1]}$$

where $u_i$, i=1, ..., N are random bits selecting said ciphertexts of "0".

Advantageously, the ciphertexts of "0" are computed once for all and stored by the second user.

The transcryption of the rows of the database can be carried out once for all by the server when the second user has been authorised to query the database by the first user. Alternatively, the transcription of the rows of the database is carried out dynamically by the server upon each query of the second user.

BRIEF DESCRIPTION OF THE DRAWINGS

Other features and advantages of the invention will appear upon reading a preferred embodiment of the invention, made with reference to the appended figures wherein.

DESCRIPTION OF THE EMBODIMENTS

Firstly, we will consider a use case representative of the application context of the present invention. In this context, a client (also called user) can query a database hosted by a remote server. For this purpose, the client sends a request having as argument a record likely to be present in the base and receives in return information indicating whether or not this record is effectively present. More generally, a plurality of clients are likely to query the database and receive in return an indicator of the presence of the records sought. One or more administrators can further proceed to add or delete records in the base. The client stations and the administrator stations collectively form the client domain. As the remote server can itself use clusters of servers distributed in the Cloud, the servers that host the database collectively form the server domain.

In the use case considered, the database, although hosted in the server domain remains the property of the client domain. In other terms, the confidentiality of the data present in the base must be guaranteed with respect to the server while making it possible for the clients of the client domain to query the latter confidentially. The confidentiality constraints to be respected between the client domain and the server domain can be stated as follows:
confidentiality of the records stored in the database hosted in the server domain with respect to the server;
confidentiality of the requests from the client domain with respect to the server;
confidentiality of the responses (indicators of presence of the records) sent back to the clients, with respect to the server.

Figure 1:
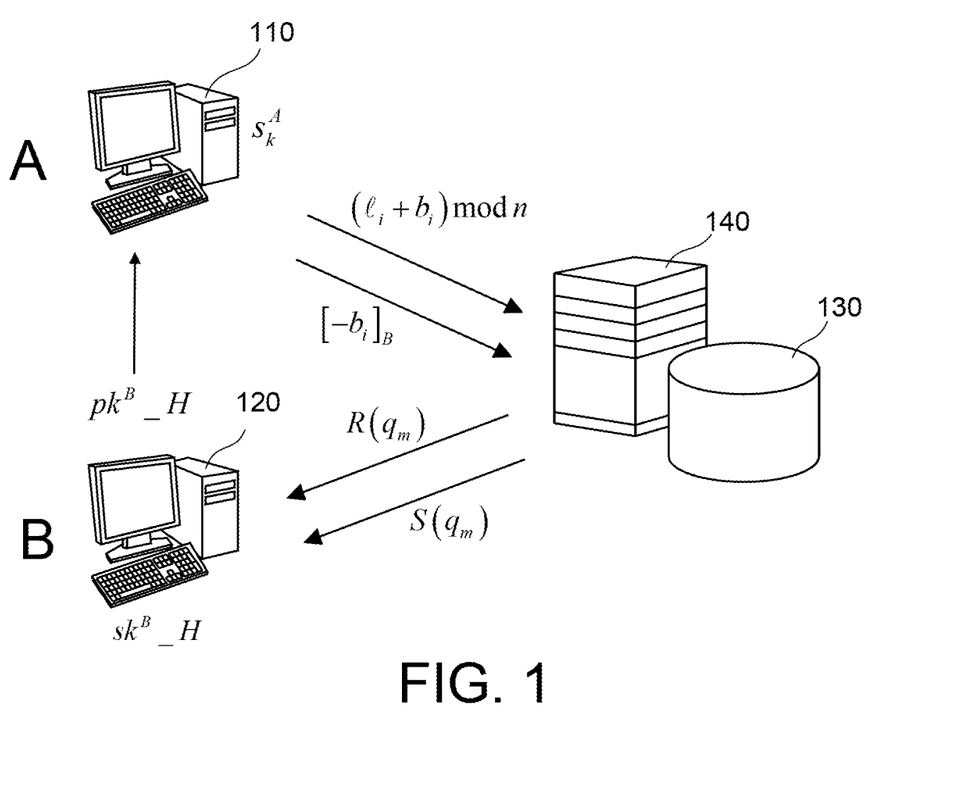
FIG. 1 schematically represents the application context of the present invention.

FIG. 1 schematically represents a use case illustrating the application context of the present invention.

In this use case, a first user A having a terminal 110 desires to make it possible for a second user B, having a terminal 120, to query, confidentially, a database, 130, hosted by a remote server, 140. We will assume that the various actors (users and server) are curious but semi-honest, that is to say follow the protocol that is imposed on them.

The records can include a plurality of fields, and consist of, for example, alphanumeric data. For example, each record may comprise the name, first name, gender, date and place of birth, address of a person. It is essential to note that this information is not however stored as such in the base but only in the form of digital footprints. Unlike the prior art, these footprints are obtained by a public cryptographic hash function, for example the SHA-3 hash function. Public hash function means a hash function that does not use confidential elements such as a secret key.

The user A or an administrator of the client domain may compute the digital footprints of the records to be stored. The digital footprints all have the same size T, for example 256 or 512 bits. Only a portion of the bits of the digital footprint provided by the hash function may be kept, for example 64 bits. For the sake of simplification, these reduced footprints will be assimilated to the digital footprints within the previous meaning, as the size reduction of the footprint can be taken into account in the hash function.

The database is "row oriented" and the digital footprints are advantageously grouped by rows. The various rows are of size L, in other words each row can comprise up to L footprints. If applicable, dummy bits may be provided to complete an incomplete row. The grouping of footprints is carried out so that the footprints of the same row possess the same m first (or alternatively last) bits, in other words the footprints represent hash values that collide on their m first bits, that is to say, in an equivalent manner; that they belong to the same collision class on these m first bits.

Preferably, the value m is selected, such as $K>2^m$ (or even $K>>2^m$) and $K<2^m L$ where K is the total number of records in the base. The first condition makes it possible to have collision classes that are not reduced to singletons, in other words to obtain a sufficiently high L value. The second condition makes it possible to classify all the footprints of the base.

The database consists of $2^m$ rows (some of which may be empty), the content of each row $i=1, \ldots, 2^m$ able to be represented by an integer $\ell_i$ of $\mathbb{Z}_n = \mathbb{Z}/n\mathbb{Z}$ with $\log_2 n \leq LT$. For reasons explained below, advantageously n=pg will be selected where p and q are prime numbers. The rows can be considered as integers taking their values in the set $\{0, \ldots, n-1\}$.

Originally, each integer $\ell_i$ is encrypted with the aid of a stream cipher with the aid of a symmetric key belonging to the user A. It is reminded that a stream cipher is an encryption which the message to be encrypted is simply added to a sequence of bits generated on the basis of a symmetric key, here noted $s_k^A$. To this end, encryption primitives known by the person skilled in the art may be used such as AES-CTR (Advanced Encryption Standard in Counter Mode), Grain, Trivium, etc.

Regardless of the stream cipher algorithm retained, the words $\ell_i$ of the rows $i=1, \ldots, 2^m$ are encrypted (or masked) by the user A by computing the sums $(\ell_i + b_i)$ mod n, $i=1, \ldots 2^m$ where the integers $b_i$ are extracted from the sequence of bits generated by $s_k^A$. It should be noted that the sequence of words $b_i$, also referred to as keystream, does not need to be stored by the user A given 15 that it can be regenerated at any time on the basis of the symmetric key $s_k^A$. The integers $b_i$ are also called masks because they make it possible to make the content of the database confidential with respect to the server.

Figure 2:
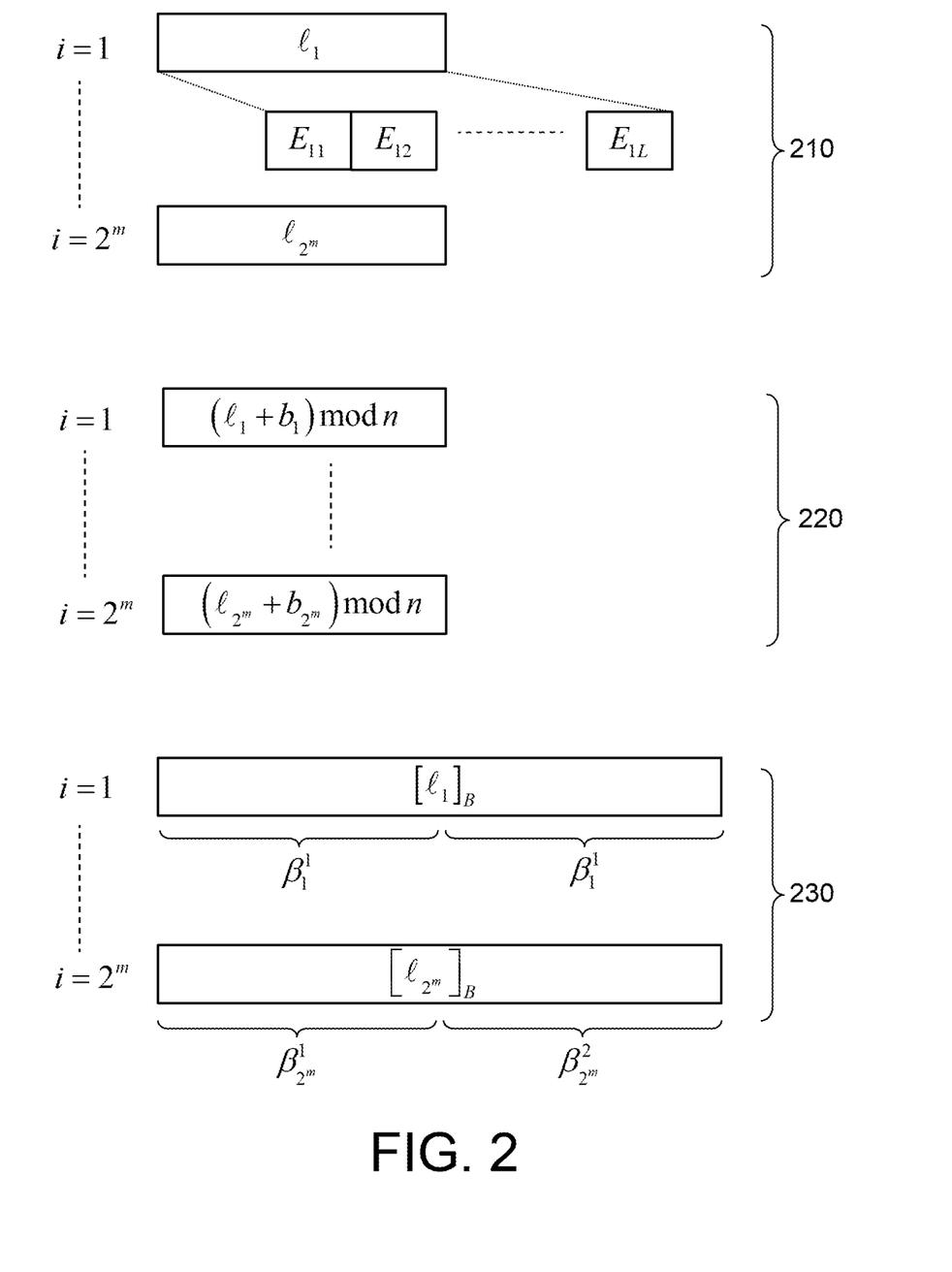
FIG. 2 schematically represents the structure of the database used in FIG. 1.

FIG. 2 schematically illustrates the structure of the database used in FIG. 1.

The structure of the base before stream cipher is represented in 210. Each of the rows $i=1, \ldots, 2^m$ is formed by a word $\ell_i$ of size $\log_2 n$ bits and comprises at most L digital footprints $E_{ij}$, $j=1, \ldots, L$ of size T.

The structure of the base after stream cipher is shown in 220. It comprises the same number of rows, each row $i=1, \ldots, 2^m$ being of size $\log_2 n$ and formed by the masked word $(\ell_i + b_i)$ mod n.

The idea behind the present invention is to transcrypt the rows thus encrypted by means of an (at least) additive homomorphic cryptosystem.

It is reminded that a homomorphic encryption makes it possible to perform operations (in practice arithmetic operations of adding or multiplying) on data without ever revealing them. More specifically, an additive homomorphic encryption is an asymmetric key encryption $\text{Enc}_{pk\_H}$ of public key pk_H) verifying the following property:
[Math. 2]

$$\text{Enc}_{pk\_H}: \Omega \to \tau$$

$$\text{Dec}_{sk\_H}[\text{Enc}_{pk\_H}(a) \oplus \text{Enc}_{pk\_H}(b)] = a+b \quad (1)$$

where $\Omega$ is the plaintext message space (more simply referred to as plaintext space) and $\tau$ is the encrypted message space (more simply referred to as ciphertext space), + an additive operation in the plaintext space conferring to $\Omega$ a group structure, $\oplus$ an internal addition operation in the ciphertext space conferring to $\tau$ a group structure. Thus, it is understood that the application of ($\Omega$, +) in ($\tau$, $\oplus$) is a group homomorphism. $\text{Dec}_{sk\_H}$ is the decryption function corresponding to $\text{Enc}_{pk\_H}$ where sk_H is the secret key of the user).

The result of the expression (1) is that it is possible to perform an additive operation between two plaintexts (a, b) on the basis of a corresponding operation between their ciphertexts ($\text{Enc}_{pk\_H}(a)$, $\text{Enc}_{pk\_H}(b)$).

An additive homomorphic encryption has an external multiplication operation of $\Omega \times \tau$ in $\tau$, noted $\otimes_{ext}$, such as
[Math. 3]

$$\text{Dec}_{sk\_H}[a \otimes_{ext} \text{Enc}_{pk\_H}(b)] = ab \quad (2\text{-}1)$$

This internal addition operation is nothing more than a consequence of the expression (1) insofar as a $\otimes_{ext}$ means that the internal addition is applied a times.

In other words, the external multiplication operation makes it possible to multiply a plaintext by a ciphertext to obtain a ciphertext. It will be noted that this operation carries out an absorption in the homomorphic domain.

Similarly, it is always possible to define an external addition operation of $\Omega \times \tau$ in $\tau$, noted $\oplus_{ext}$, by means of:
[Math. 4]

$$a \oplus_{ext} \text{Enc}_{pk\_H}(b) = \text{Enc}_{pk\_H}(a) (61) \text{Enc}_{pk\_H}(b) \quad (2\text{-}2)$$

in which case:
[Math. 5]

$$\text{Dec}_{sk\_H}[a-_{ext} \text{Enc}_{pk\_H}(b)] = a+b \quad (2\text{-}3)$$

In some cases, the cryptosystem natively has an external addition operation. This is particularly and advantageously the case for the Paillier cryptosystem.

Without loss of generality, we will assume in the following that the additive homomorphic cryptosystem is a Paillier cryptosystem.

It is assumed in the following that each user has their own additive homomorphic cryptosystem. The private key-public key pair of the homomorphic cryptosystem of the user A is noted ($sk^A\_H$, $pk^A\_H$) and that of B is noted ($sk^B\_H$, $pk^B\_H$).

Transcryption is a cryptographic technique making it possible to change data encrypted by a first cryptosystem to the same data encrypted by a second cryptosystem (inevitably homomorphic), without passing through an intermediate step of decrypting in the plaintext space.

In the present case, the transcryption operation makes it possible to change from a stream ciphertext to a ciphertext in the homomorphic domain. More specifically, if the homomorphic ciphertext of x is noted $[x]_B$ by means of the public keypk$^B$_H, the following is obtained:
[Math. 6]

$$(\ell_i + b_i)(\oplus_{ext} [-b_i]_B = [\ell_i + b_i - b_i]_B = [\ell_i]_B \quad (3)$$

that is to say the homomorphic ciphertext of the row in question.

In practice, when the user A desires to authorise the user B to query their database, they encrypt the inverse masks, that is to say the words $-b_i$ i=1, ..., $2^m$ (the masks $b_i$ being from the keystream), by means of the public key of the additive homomorphic cryptosystem of B then transmit them to the server which performs the unmasking operation (3) on the rows of the database. This unmasking operation in the homomorphic domain may be carried out once for all in "offline" mode or on the contrary, on the fly, whenever the user B asks the user A to access the database (owned by A). It will be noted that the operation (3) protects the 5 confidentiality of data with respect to the server because the latter does not have access to the first term of the expression (due to the masking) or to the second due to the homomorphic encryption.

According to one alternative embodiment, instead of the operation (3), the server can overencrypt the values ($\ell_i + b_i$) of the base with the aid of the public key pk$^B$_H to obtain the homomorphic ciphertext $[\ell_i + b_i]_B$. The homomorphic ciphertext of the row i can then be obtained by means of the internal addition operation:
[Math. 7]

$$(\ell_i + b_i) \oplus_{ext} [-b_i]_B = [\ell_i + b_i - b]_B = [\ell_i]_B \quad (4)$$

Returning back to FIG. 2, the structure of the base after transcryption is represented in 230. It is noted that the base still consists of rows i=1, ..., $2^m$ but here these are of double size (the ciphertexts have a size double that of the plaintexts) and respectively contain $[\ell_i]_B$, i=1, ..., $2^m$. Each ciphertext $[\ell_i]_B$ consequently consists of two words of $\log_2$ (n), noted $a\beta_i^1$ and $\beta_i^2$, stored in the row i.

The user B can then transmit to the server a request concerning the presence of a given record, according to a PIR-type protocol. For this purpose, the user B computes the digital footprint of the record sought by means of the public hash function having served for constructing the base. The integer value associated with the digital footprint is noted q and the integer value associated with the m first bits of this footprint is noted $q_m$. The request is formed by a vector u of $2^m$ encrypted with a ciphertext of the value "1" in position $q_m$, the remainder consisting of ciphertexts of the value "0". In other words:
[Math. 8]

$$\text{Dec}_{sk^B\_H}(u_i) = \delta_{i,q_m} \quad (5)$$

where $u_i$ is the $i^{th}$ element of the vector u and $\delta$ is the Kronecker symbol.

For any i=1, ..., $2^m$, the server computes $U_i \otimes_{ext} \delta_i^1$ and $u_i \otimes_{ext} \delta_i^2$, without taking into account the fact that the values and fL are ciphertext portions, then computes the following sums in the homomorphic space:

[Math. 9]

$$\bigoplus_{i=1}^{2^m} (u_i \otimes_{ext} \beta_i^1) = [\beta_{q^m}^1]_B \quad (6\text{-}1)$$

-continued

[Math. 10]

$$\bigoplus_{i=1}^{2^m}(u_i \otimes_{ext} \beta_i^2) = [\beta_{q^m}^2]_B \qquad (6\text{-}2)$$

in application of the expressions (1) and (2). It will be noted that these expression correspond to an evaluation in the homomorphic domain of a scalar product in the plaintext domain.

The homomorphic ciphertexts $[\beta_q^1 m]_B$ and $[\beta_q^2 m]_B$ form the response that is returned to the user B. It will be understood that the server can under no circumstances determine the row $(q_m)$ that has responded or a fortiori the content of the response.

The user B then decrypts $[\beta_q^1 m]_B$ and $[\beta_q^2 m]_B$ by means of their private key, $sk^B\_H$, then concatenates the values obtained $\beta_q^1$, and $\beta_q^2 m$ to form the ciphertext of the row:

[Math.11]

$$[\ell_q m]_B = \beta_q^1 m | \beta_q^2 m \qquad (7)$$

which is, in turn, decrypted with the private key $sk^B\_H$ to provide the list of footprints $E_q m_j$, $j=1, \ldots, L$ initially stored in the row $q^m$ of the base.

The user can finally verify whether the digital footprint of the record sought is part of the list of footprints $E_q m_j$, $j=1, \ldots, L$ thus obtained.

Figure 3:
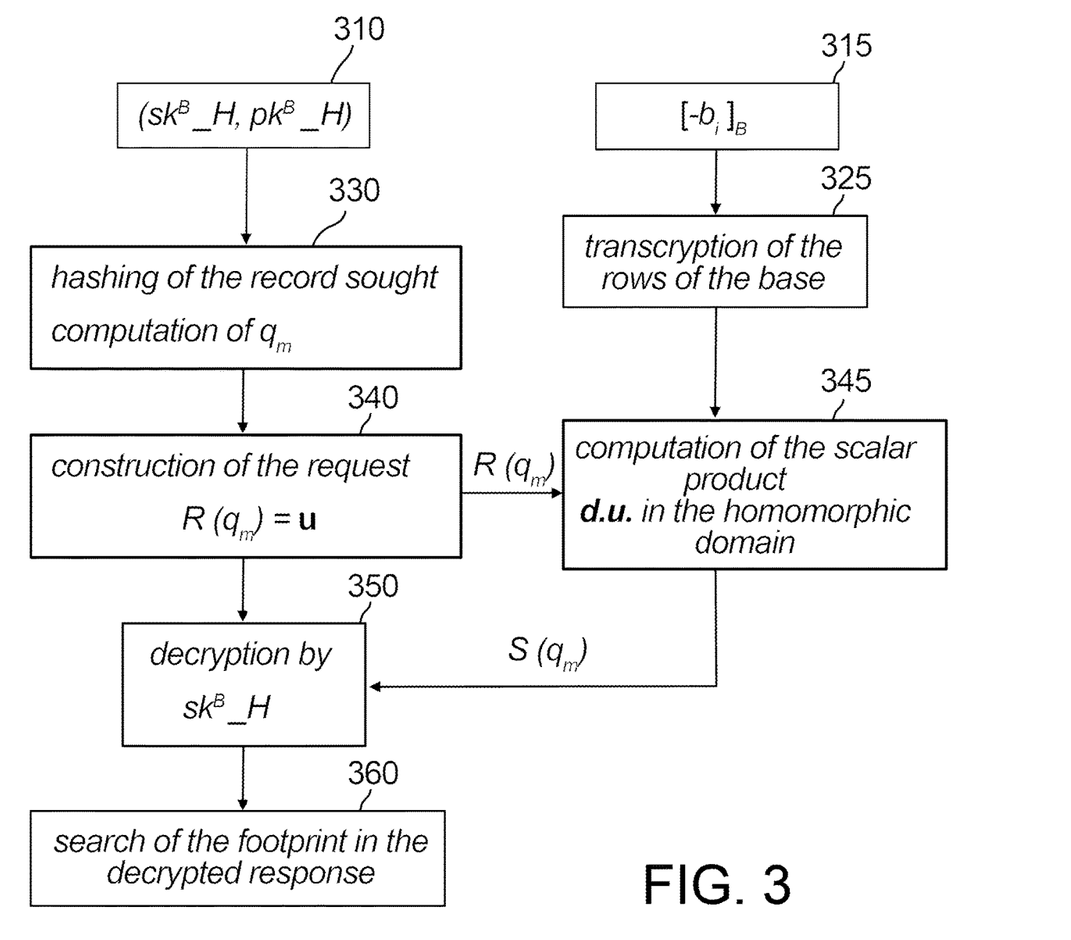
FIG. 3 schematically represents a method for querying a database according to one embodiment of the present invention.

FIG. 3 schematically represents a method for querying a database according to a first embodiment of the present invention.

The left section of the figure corresponds to the terminal of the user B, and the right section to the server hosting the database. It is assumed that the database has been encrypted beforehand by means of a keystream generated on the basis of a symmetric key of A, $s_K^A$. More specifically, each row i of the base has been encrypted beforehand by means of a word $b_i$ from this keystream.

The terminal B has an additive homomorphic cryptosystem ($sk^B\_H$, $pk^B\_H$) in 310 and the hosting server of the database has received from the user A, in 315, the homomorphic ciphertexts $[-b_i]_B$ obtained by encryption on the basis of the public key of B, $pk^B\_H$.

In step 325, the server performs a transcryption of the rows of the database by means of $(\ell_i + b_i) \oplus_{ext} [-b_i]_B = [\ell_i]_B$, $i=1, \ldots, 2^m$. This transcryption converts the rows encrypted by a symmetric key encryption $s_K^A$ into rows encrypted by an additive homomorphic encryption by means of the public key $pk^B\_H$.

In step 330, the user B searching in the base for a given record, computes their digital footprint by means of the public hash function having served for constituting the base, and deduces therefrom the integer value $q_m$ associated with the first m bits of this footprint.

In step 340, the user B constructs a request $R(q_m)$ in the form of a vector u of $2^m$ encrypted with a homomorphic ciphertext of the value "1" in position $q_m$, the other elements of this vector being homomorphic ciphertexts of the value "0":

[Math.12]

$$u=([0]_B, \ldots, [0]_B, [0]_B, \ldots, [0]_B) \qquad (8)$$

The request $R(q_m)$ is then transmitted to the server.

In step 345, the server evaluates in the homomorphic domain the scalar product between the vector u and the vector d of size $2^m$ consisting of the encrypted rows $[\ell_i]_B$, $i=1, \ldots, 2^m$:

[Math. 13]

$$d=([\ell_1]_B, \ldots, [\ell_{2^m}]_B) \qquad (9)$$

and sends the result $S(q, m)$ back to the user B. In the case where the additive homomorphic cryptosystem is a Paillier cryptosystem, the result may consist of two homomorphic ciphertexts stored at the row $q_m$, $[\beta_q^1 m]_B$ and $[\beta_q^2 m]_B$, as explained above.

In step 350, the user B performs a decryption of the response received, by means of their private key $sk^B\_H$ to obtain the content of the row $q_m$ in plaintext, i.e. $\ell_q m$. It is reminded that, in the case of a Paillier system, this step comprises three decryption steps: decryption of the ciphertexts $[\beta_q^1 m]_B$ and $[\beta_q^2 m]_B$, then decryption of the concatenated results $[\ell_q m]_B = \beta_q^1 m | \beta_q^2 m$. In the case of a fully homomorphic cryptosystem or Fully Homomorphic Encryption (FHE), a single decryption operation is necessary for the user B, the first operation able to be carried out in the homomorphic domain by the server according to a technique referred to as bootstrapping.

Finally, in step 360, the user B determines whether the digital footprint sought is among the footprints $E_q m_j$, $j=1, \ldots, L$ of t he row $\ell_q m$.

Although the present invention has been described in the case of an additive homomorphic cryptosystem, the person skilled in the art will understand that it applies a fortiori in the case of a FHE cryptosystem. It is reminded that a FHE is a group homomorphism both in accordance with an internal addition law and with an internal multiplication law. The homomorphic encryption (additive or FHE) may be based on a Learning With Errors (LWE) scheme, in a manner known per se.

Generally, an additive homomorphic cryptosystem will be preferred, because leading to simpler computations than in the case of a FHE cryptosystem.

According to a first example of embodiment already mentioned, the additive homomorphic cryptosystem may be a Paillier cryptosystem.

It is reminded that the public key of a Paillier cryptosystem is defined by a pair of integers (g, n) and that the ciphertext of a message $\mu \in \mathbb{Z}_n$ is given by:

[Math. 14]

$$c = g^\mu r^n \bmod n^2 \qquad (10)$$

where $r \in \mathbb{Z}_n$ is a random variable

It will be noted that the computation of the scalar product in step 345 only involves ciphertexts of "1" and of "0" and that consequently the cost of the encryption is essentially dominated by the computation of the term $r^n$ n mod $n^2$, and is therefore generally high as a result of high values of the exponent n. It is reminded that n =pq where p, q are two prime numbers of large size.

Advantageously, a simpler encryption may alternatively be selected, by precomputing ciphertexts of "0" with N various random variable values, i.e.:

[Math. 15]

$$h_1 = r_1 \bmod n^2$$
$$\vdots$$
$$h_N = r_N \bmod n^2 \qquad (11)$$

the ciphertext of a message $\mu \in \mathbb{Z}_n$ being given by:

[Math. 16]

$$c = g^\mu \pi_{i=1}^N \max(1, u_i h_i) \bmod n^2 \qquad (12)$$

where $u_i$, $i=1, \ldots, N$ are random bits aiming to select said ciphertexts of "0". It will be understood that the expression max(1, $u_ih_i$) leaves the product invariant when the ciphertext of "0", $h_i$, is not selected. The operation (13) is therefore the same in the homomorphic domain with the addition to the message μ of a random number $v=\Sigma_{i=1}^{N} u_i$ of "0". The values $h_i$, i=1, ..., N can be computed once for all and stored by the second user. These values $h_i$ can even be public. In any case, the additive homomorphic encryption simply involves selecting bits $u_i$ and performing the computation of the expression (13), the latter not requiring modular exponentiation. Of course, the bits $u_i$ may be, for their part, single-use and therefore do not need to be stored by the second user.

What is claimed is:

1. Method for confidentially querying the presence of a record in a database hosted by a server, said records being stored in the database in the form of digital footprints, each digital footprint being obtained by hashing a record by means of a public hash function and each row of the database containing the digital footprints sharing their m >1 first bits, wherein:
   a first user has a stream cipher symmetric key and a second user has an at least additive homomorphic cryptosystem;
   the rows of the database are encrypted by means of said stream cipher by adding masks each having the size of a row of the database;
   the first user authorises the access to the database to the second user by encrypting the inverse masks by means of the public key of said homomorphic cryptosystem and by transmitting the inverse masks thus encrypted to the server;
   the rows of the database are transcrypted in the homomorphic domain by adding to said rows the inverse masks thus encrypted;
   the second user computes the digital footprint of the record by means of said public hash function and deduces therefrom an integer value, $q_m$, corresponding to the m first bits;
   the second user constructs a request in the form of a first vector of size $2^m$ consisting of a homomorphic ciphertext of the value "1" in position $q_m$ and of homomorphic ciphertexts of the value "0" in the other positions, the request being transmitted to the server;
   the server evaluates in the homomorphic domain the scalar product between the first vector and a second vector of size $2^m$ consisting of the encrypted rows of the database, the result being transmitted as a response to the second user;
   the second user decrypts said response by means of the private key of their homomorphic cryptosystem and deduces therefrom the plaintext content of the row $q_m$ of the database;
   the second user searches whether the digital footprint of the record is among the digital footprints of the row $q_m$ thus obtained, wherein the transcryption of the rows of the database is carried out once for all by the server when the second user has been authorised to query the database by the first user.

2. Method for confidentially querying the presence of a record in a database according to claim 1 wherein the stream cipher uses an encryption primitive selected from AES-CTR, Trivium and Grain.

3. Method for confidentially querying the presence of a record in a database according to claim 1, wherein the cryptographic public hash function is SHA-3.

4. Method for confidentially querying the presence of a record in a database according claim 1, wherein the homomorphic cryptosystem is an additive homomorphic encryption without being FHE.

5. Method for confidentially querying the presence of a record in a database according to claim 4, wherein the additive homomorphic encryption uses a public key Paillier cryptosystem (g, n) with n=pq where p, q are two prime numbers.

6. Method for confidentially querying the presence of a record in a database according to claim 5, wherein the server returns as response a first and a second ciphertext stored in the line $q_m$, the second user performing a decryption of each of the first and second ciphertexts by means of the private key of its homomorphic cryptosystem, then performs a decryption by means of this private key of the results thus obtained after having concatenated them.

7. Method for confidentially querying the presence of a record in a database according to claim 5, wherein the additive homomorphic encryption uses a plurality N of ciphertexts of "0" by a Paillier encryption, $h_i$, i=1, ..., N, the additive homomorphic encryption of an integer μ being obtained by:

$$c = g^{\mu} \pi_{i=1}^{N} \max(1, u_ih_i) \bmod n^2$$

where $u_i$, i=1, ..., N are random bits selecting said ciphertexts of "0".

8. Method for confidentially querying the presence of a record in a database according to claim 7, wherein the ciphertexts of "0" are computed once for all and stored by the second user.

9. Method for confidentially querying the presence of a record in a database hosted by a server, said records being stored in the database in the form of digital footprints, each digital footprint being obtained by hashing a record by means of a public hash function and each row of the database containing the digital footprints sharing their m >1 first bits, wherein:
   a first user has a stream cipher symmetric key and a second user has an at least additive homomorphic cryptosystem;
   the rows of the database are encrypted by means of said stream cipher by adding masks each having the size of a row of the database;
   the first user authorises the access to the database to the second user by encrypting the inverse masks by means of the public key of said homomorphic cryptosystem and by transmitting the inverse masks thus encrypted to the server;
   the rows of the database are transcrypted in the homomorphic domain by adding to said rows the inverse masks thus encrypted;
   the second user computes the digital footprint of the record by means of said public hash function and deduces therefrom an integer value, $q_m$, corresponding to the m first bits;
   the second user constructs a request in the form of a first vector of size $2^m$ consisting of a homomorphic ciphertext of the value "1" in position $q_m$ and of homomorphic ciphertexts of the value "0" in the other positions, the request being transmitted to the server;
   the server evaluates in the homomorphic domain the scalar product between the first vector and a second vector of size $2^m$ consisting of the encrypted rows of the database, the result being transmitted as a response to the second user;

the second user decrypts said response by means of the private key of their homomorphic cryptosystem and deduces therefrom the plaintext content of the row $q_m$ of the database;

the second user searches whether the digital footprint of the record is among the digital footprints of the row $q_m$ thus obtained, wherein the transcryption of the rows of the database is carried out dynamically by the server upon each query of the second user.

10. Method for confidentially querying the presence of a record in a database according to claim 9, wherein the stream cipher uses an encryption primitive selected from AES-CTR, Trivium and Grain.

11. Method for confidentially querying the presence of a record in a database according to claim 9, wherein the cryptographic public hash function is SHA-3.

12. Method for confidentially querying the presence of a record in a database according to claim 9, wherein the homomorphic cryptosystem is an additive homomorphic encryption without being FHE.

13. Method for confidentially querying the presence of a record in a database according to claim 12, wherein the additive homomorphic encryption uses a public key Paillier cryptosystem (g,n) with n=pq where p, q are two prime numbers.

14. Method for confidentially querying the presence of a record in a database according to claim 13, wherein the server returns as response a first and a second ciphertext stored in the line $q_m$, the second user performing a decryption of each of the first and second ciphertext by means of the private key of its homomorphic cryptosystem, then performs a decryption by means of this private key of the results thus obtained after having concentrated them.

15. Method for confidentially querying the presence of a record in a database according to claim 13, wherein the additive homomorphic encryption uses a plurality N of ciphertexts of "0" by a Paillier encryption, $h_i$, i=1,...,N, the additive homomorphic encryption of an integer $\mu$ being obtained by:

$$c = g^{\mu} \pi_{i=i}^{N} \max(1, u_i h_i) \bmod n^2$$

where $\mu$, i=1, ... ,N are random bits selecting said ciphertexts of "0".

16. Method for confidentially querying the presence of a record in a database according to claim 15, wherein the ciphertexts of "0" are computed once for all and stored by the second user.

* * * * *